May 9, 1961
C. T. WEYMANN
2,983,346
AUTOMATIC CLUTCH ENGAGING AND DISENGAGING DEVICE
Filed Oct. 23, 1958
4 Sheets-Sheet 1
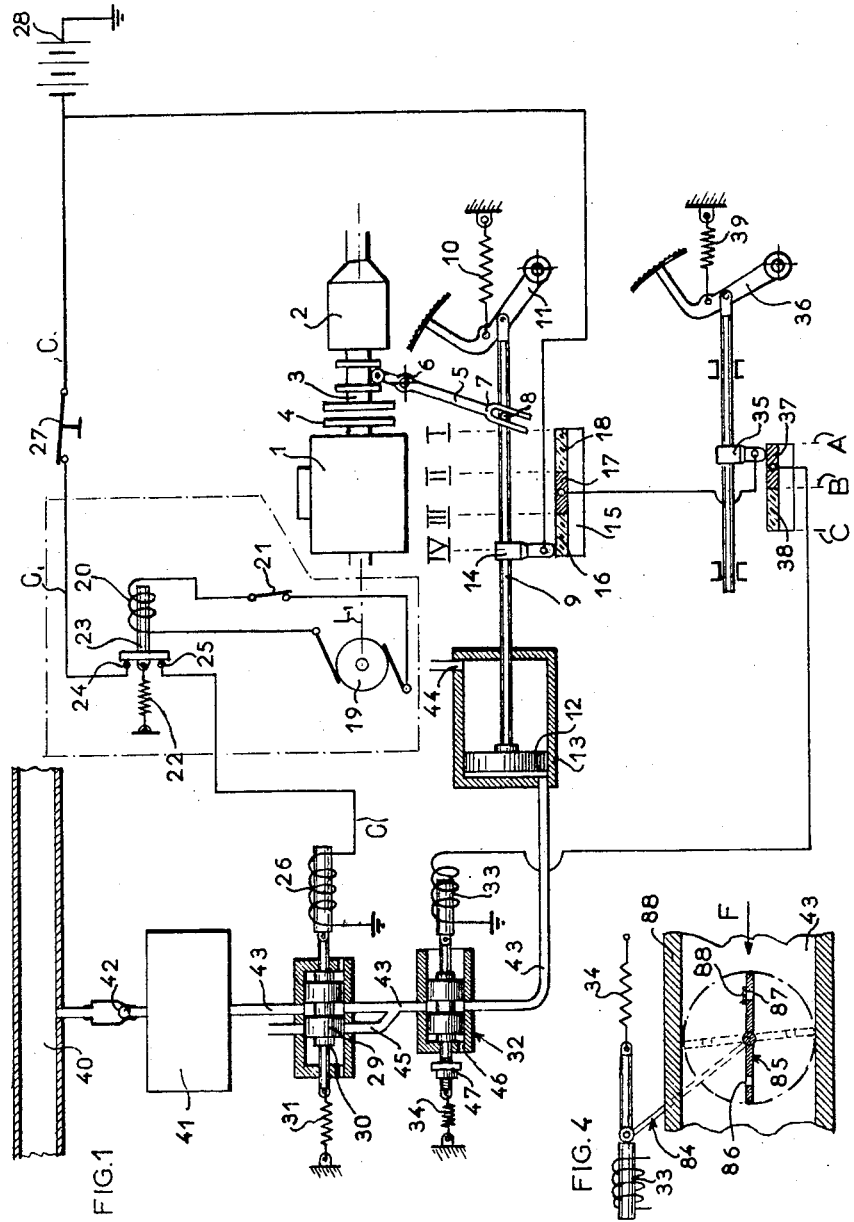
Inventor
C. T. Weymann
By Clarence A. O'Brien & Harvey B. Jacobson
Attys

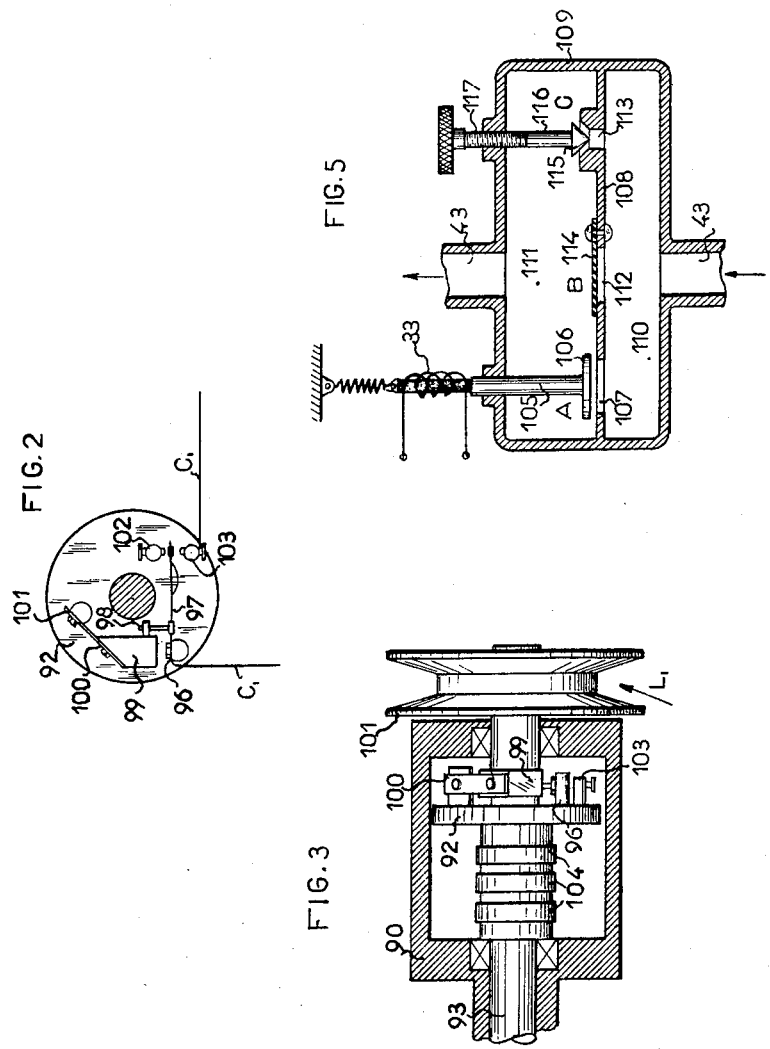

May 9, 1961 C. T. WEYMANN 2,983,346
AUTOMATIC CLUTCH ENGAGING AND DISENGAGING DEVICE
Filed Oct. 23, 1958 4 Sheets-Sheet 3

Inventor
C. T. Weymann
By Glascock Downing Seebold
Attys.

United States Patent Office 2,983,346
Patented May 9, 1961

2,983,346
AUTOMATIC CLUTCH ENGAGING AND DISENGAGING DEVICE
Charles Terrès Weymann, 102 Ave. Victor Hugo, Paris, France
Filed Oct. 23, 1958, Ser. No. 769,120
Claims priority, application France Oct. 28, 1957
10 Claims. (Cl. 192—.076)

The invention relates to a device whereby various clutch engaging and disengaging operations are effected automatically, more particularly when causing a vehicle to start or stop moving.

In designing an automatic clutch, the following paradox is encountered: either the coupling of the engine to the driven part is extremely gradual and clutch engagement is sometimes too slow, for example when it is desired to move off quickly, or the coupling is insufficiently progressive and there is risk of stalling the engine or creating shocks, jarring, etc., which are liable to harm the mechanism.

In fact, it is impossible to obtain a satisfactory compromise, since the ideal clutch engaging and disengaging conditions are different dependent upon whether the object of these operations is to cause the vehicle to move off or stop or to change from one speed ratio to another. Further, in either of these two types of operation, the conditions are a function of outside circumstances (profile or state of the road).

It is essential to allow the driver to intervene at any moment in the automatic clutch engagement and disengagement operating conditions, at least when the object of these operations is to cause the vehicle to move off or stop.

The object of the invention is to provide an automatic clutch engaging and disengaging device which is specially adapted for moving off and stopping, and ordinarily affords optimum clutch engagement and disengagement operating conditions for these particular operations but comprises selecting means actuated by the accelerator pedal and permitting the driver to intervene at any moment for creating any other clutch engagement and disengagement operating conditions.

It will be understood that the other clutch engagement and disengagement operations for changing the speed ratios are effected by any suitable means.

For example, for a conventional disc clutch, said optimum operating conditions result in an approach of the discs which is as rapid as possible, a progressive coupling and a very rapid full clutch engagement.

In a particular form of the invention, the device ordinarily effects the clutch engagement and disengagement in three successive stages, namely: a first rapid approach stage, a second middle stage corresponding to the coupling of the clutch, and a last stage ensuring a rapid full clutch engagement, for example under the same operating conditions as those of the approach stage.

In one manner of carrying out the invention, the selecting means actuated by the accelerator pedal substitute a rapid stage for the aforementioned slow middle stage, for example under the same operating conditions as the approach and full clutch engagement stages, when the driver depresses the accelerator pedal beyond a certain limit.

In a modification of the invention, the said selecting means are so designed that such a rapid stage is also substituted for the aforementioned slow middle stage whenever the accelerator pedal is not depressed to a well defined degree. In other words, in this modification, the three-stage automatic operation exclusively takes place if the accelerator pedal is partly depressed within two well-defined limits.

In this modification, the device is preferably provided with control means such as an electromagnet to set the said selecting means, whatever may be the position of the accelerator pedal, to the same conditions as when the said pedal is not depressed at all. In other words, these additional control means permit establishing constant conditions during the whole stroke of the clutch, even if the accelerator pedal is more or less depressed.

According to the invention, the automatic clutch engagement and disengagement under optimum operating conditions defined hereinbefore, are ensured by an actuating mechanism which is responsive to the speed of the engine and causes clutch engagement when said speed reaches a predetermined value and clutch disengagement when said speed drops to a predetermined value, and by a selective control mechanism which imposes on said actuating mechanism in the course of the clutch engagement and disengagement travel a predetermined succession of different operating conditions.

In particular, in the aforementioned form of the invention, said succession of different operating conditions corresponds to a first part of the clutch travel which is effected rapidly, an intermediate part effected slowly and an end of travel effected rapidly.

In a preferred form of the invention, the clutch engaging and disengaging device comprises means of the cylinder and piston type (for example a bellows or diaphragm), coupled to the linkage of the clutch, a source of fluid, air having a negative pressure (vacuum), compressed air or liquid under pressure, actuating said cylinder-piston means, a main distributor or valve means controlling the supply and exhaust of the fluid, one or more other distributors or valve means interposed between the main distributor and the cylinder-piston means and capable of leaving open, or more or less throttled, the communication between the main distributor and the cylinder-piston means, and suitable means for controlling said distributors and whose essential object is to ensure that the main distributor is opened or closed as a function of the rotational speed of the engine, and that the interposed distributors are opened or throttled as a function of the position of the clutch control and of the position of the accelerator pedal.

By way of example, the source of energy for ensuring operation of the device of the invention could be afforded by the negative pressure or suction prevailing in the induction pipe of the engine.

The invention will be better understood from the ensuing description, with reference to the accompanying drawings, of two embodiments of the invention to which the latter is in no way restricted.

In the drawings:

Fig. 1 shows, in a partially diagrammatic form with the essential devices in longitudinal section, an automatic clutch device embodying the invention;

Fig. 2 is a view of a modification of the device shown in Fig. 1, in which a centrifugal force switch is used instead of a dynamo for rendering the device of the invention responsive to the speed of the engine;

Fig. 3 is an axial sectional view of means for driving the switch shown in Fig. 2;

Fig. 4 is a sectional view of a modification of a detail of the device shown in Fig. 1;

Fig. 5 is a sectional view of another modification of the same detail;

Figure 6:
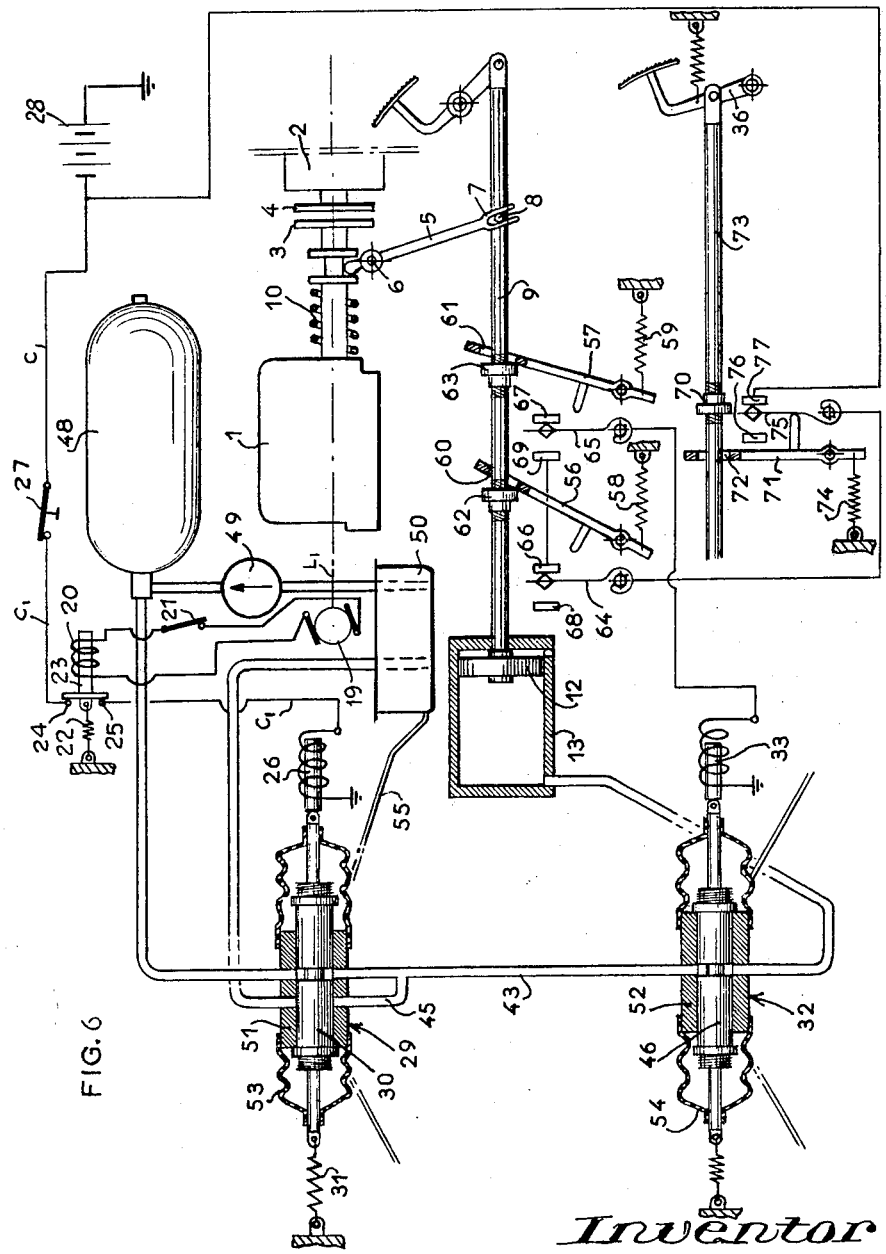
Fig. 6 is a view in more detail of another device embodying the invention.

In the embodiment shown in Fig. 1, the engine 1 is to be coupled by means of the clutch to a driven element 2, which could be, for example, the gear box of a motor vehicle. Reference numeral 3 denotes the controlled element of the clutch which in the presently-described embodiment is rigid as concerns rotation with the driven element 2 and carries a disc adapted to be engaged with a coacting disc 4 constantly driven by the engine 1. The controlled element 3 of the clutch is actuated by a lever 5 which is pivotably mounted at a fixed point 6 and has a forked end 7 which straddles a pin 8 of an actuating rod 9 constantly biased toward the right (as viewed in Fig. 1) by a spring 10 which therefore tends to cause clutch engagement. In the figure, the usual clutch pedal 11 has been shown to indicate that its action is rendered unnecessary by the device according to the invention, but it will be understood that it could be retained on the vehicle so as to permit using the clutch in the conventional manner in the event of failure of the device.

The rod 9 is unitary with a piston 12 which is slidably mounted in a cylinder 13. It is also unitary with a first switch device including a slider 14 which is adapted to slide along a contact strip generally indicated by the reference numeral 15. This sliding movement is so adjusted that the travel toward the right (as viewed in Fig. 1) of the slider 14 corresponds to the clutch engagement travel of the controlled element 3. This travel is divided into a number of stages constituting the optimum clutch operating conditions mentioned hereinbefore. The illustrated example corresponds to the particular case, also mentioned hereinbefore, of a conventional disc clutch, and in this example the travel of the slider 14 corresponds to a first stage between positions IV and III, when the slider moves along an insulated portion 16; this is the rapid approach stage. Thereafter, there is the gentle coupling stage in the course of which the slider 14 moves along a conductive portion 17 between the positions III and II. Finally, the slider reaches a second insulated portion 18 along which it travels between the positions II and I; this is the final rapid full clutch engagement stage. It will be understood that in the course of clutch disengagement, the slider 14 returns from the position I to the position IV in passing in turn through the insulated portion 18, the conductive portion 17 and the insulated portion 16 which determines a succession of clutch disengagement stages comprising a rapid reduction in the pressure applying the discs against one another, a slow separation of these discs, and a rapid withdrawal back to the withdrawn position of the element 3. The cylinder 13 is actuated for both clutch engagement and disengagement by an actuating mechanism responsive to the speed of the engine 1.

In the form of the invention shown in Fig. 1, said actuating mechanism comprises a dynamo 19 which feeds the winding 20 of an electromagnetic contactor controlled by a switch 21 which is adapted to render the device inoperative, for example for disengaging the clutch manually, even though the speed of the engine corresponds to automatic clutch engagement conditions. The electromagnetic contactor 20 is maintained closed by a spring 22 so long as the current in the winding 20 is not sufficiently intense for attracting the core 23 in opposition to the action of said spring. The fixed contacts 24 and 25 of this contactor are inserted in the excitation circuit of an electromagnet 26 which circuit also includes a main switch 27. A battery 28 feeds this circuit.

The mechanism responsive to the speed of the engine 1 could also be formed by a device actuated by centrifugal force, of a type similar to the device described in the French Patent No. 1,069,708, filed on October 31, 1952 by the applicant and entitled "Automatic Control Device for Electromagnetic Speed Change or the Like" or in the first Addition No. 64,746 of this patent filed by the same applicant on October 27, 1953.

Figs. 2 and 3 show a governor 90 comprising a plate 92 mounted on a shaft 93 which, in the presently-described embodiment, is driven by the engine 1 through a pulley 91 and a V-belt.

As can be seen in Fig. 2, the plate 92 carries a microswitch 96 whose moving contact 97 is actuated by a rod 98 against which bears a weight 99 carried by a spring strip 100 which is mounted in cantilever fashion on the plate 92 as shown at 101. A neutral fixed contact or stud 102 and a fixed contact 103 are interposed with the moving contact 97 in the excitation circuit of the electromagnet 26 (see Fig. 1). This device could replace the structure surrounded by dot-dash lines in Fig. 1 by a simple connection of the terminals 103 and 96 to the conductors $C_1$ of Fig. 1 instead of said structure and by the provision of a mechanical connection by means of a belt between the engine 1 and the pulley 91 instead of the mechanical connection represented symbolically at $L_1$ in Fig. 1 between the engine 1 and the dynamo 19.

A practical manner of connecting the terminals 96 and 103 to the conductors $C_1$ is by slip rings 104, as shown in Fig. 3, which could be associated with fixed brushes (not shown in the drawing).

When the rotational speed of the plate 92 reaches a predetermined value, the weight 99—which centrifugal force tends to move outwardly and whose strip 100 creates on the moving contact 97 through the medium of the rod 98 a torque which maintains the contact against the contact 103—releases this torque so that the moving contact 97, whose adjustment is such as to bias it toward the neutral contact 102, is brought against the latter and opens the excitation circuit of the electromagnet 26. On the other hand, when the speed decreases, the force urging the weight outwardly progressively decreases and, when the speed has dropped to the aforementioned predetermined value, the moving contact 97 is returned against the contact 103 by the strip 100 in opposition to its own resilience and the excitation circuit of the electromagnet 26 is closed.

The electromagnet 26 controls a distributor or valve means which is generally designated by the reference numeral 29 and whose slide 30 is constantly biased toward the left (as viewed in Fig. 1) by a spring 31. A second distributor or valve means 32 is controlled in a similar manner by an electromagnet 33 in opposition to the action of a spring 34 which constantly biases the distributor toward the left (as viewed in Fig. 1). The excitation circuit of the electromagnet 33 is controlled, on the one hand, by the main switch slider 14 mechanically connected to the piston 12 and to the controlled element 3 of the clutch, and, on the other hand, by a second switch whose moving element is formed by a slider 35 connected to the accelerator pedal 36. When the pedal 36 is slightly depressed, the slider 35 moves along a conductive portion 37 between the points A and B, whereas when the pedal 36 is fully depressed, the slider 35 comes into contact with a non-conductive portion 38 between the points B and C. The pedal 36 is biased toward its raised position by a spring 39 in the conventional manner.

The cylinder 13 is fed by a source of fluid under the control of the two distributors 29 and 32. In the presently-described embodiment, this source is constituted by a pipe 40 (the induction pipe of the engine) in which prevails a suction or negative pressure which creates a suction in a vacuum chamber 41 by way of a check valve 42. The chamber 41 creates, by way of a pipe 43, a suction effect in the left part of the cylinder 13 (as viewed in Fig. 1), whose right part communicates with the atmosphere by way of an aperture 44. A branch pipe 45, connected to the pipe 43 between the distributors 29 and 32, also communicates with the atmosphere under the control of one of the elements of the slide 30 of the distributor 29.

The device just described operates in the following manner:

In the disengaged clutch position shown in Fig. 1, the electromagnet 26 is excited and the slide 30 is in such position that it closes the branch pipe 45 but opens the pipe 43. The electromagnet 33 is unexcited and due to the effect of its spring 34 its slide 46 also leaves the pipe 43 open. Under these conditions, the cylinder 13 is subject to suction from the pipe 40 and the piston 12 is held in its extreme left position as shown in Fig. 1, in which position the controlled element 3 of the clutch is in its withdrawn inoperative position and the slider 14 of the main switch is in position IV at the end of the insulated portion 16. It can be seen that the device remains in this disengaged clutch position irrespective of the position of the accelerator pedal 36 owing to the fact that the excitation circuit of the electromagnet 33 is open, at least at the main switch 14; thus it is immaterial whether this circuit is opened or closed at a second point by the switch 35.

If under these conditions the engine 1 accelerates, for example as a result of the driver depressing the pedal 36, when the speed of the engine reaches a certain number of revolutions per minute, for example about 1000 r.p.m. for a normal motor vehicle, the current generated by the dynamo 19 becomes sufficiently intense for actuating the contactor 23. At this moment, the excitation circuit of the electromagnet 26 is opened and the slide 30 of the distributor 29 is urged toward the left (as viewed in Fig. 1) causing the closure of the pipe 43 and creating by way of the branch pipe 45 a communication between the left part of the cylinder 13 with the atmosphere. Thenceforth, under the effect of the spring 10, the moving assembly comprising the piston 12, the rod 9, the slider 14, the lever 7 and the controlled element 3 of the clutch, starts to move rapidly at a speed which is limited only by the dash-pot effect of the aperture 44 and the pipe 43 until the slider 14 reaches the conductive portion 17 at III. At this moment, if the pedal 36 is not depressed sufficiently to cause the slider 35 to leave the conductive portion 37, the electromagnet 33 is excited and the pipe 43 is throttled by the slide 46 to an extent determined by the position of an adjustable abutment 47 mounted on said slide. Under these conditions, the aforementioned dash-pot effect is considerably increased and the moving assembly continues to move at a much lower speed. This is the second stage of the clutch engagement, which constitutes the progressive coupling of the controlled element 3 with the element 4 driven by the engine 1. At the end of this stage, when the slider 14 reaches the point II in its travel it once more comes into contact with an insulated portion 18 and the conditions which prevailed in the approach travel IV—III are resumed. Thus full engagement of the clutch is effected rapidly.

It will be observed that, if in the course of the middle stage of progressive coupling (III—II) the driver depresses the accelerator pedal 36 in such manner that the slider 35 travels beyond the point B, said slider is shifted to the insulated portion 38, which causes opening of the excitation circuit of the electromagnet 33 and the conditions prevailing in the rapid stages IV—III and II—I are resumed.

The clutch is disengaged automatically when the speed of the engine 1 drops below a predetermined value (for example about 1000 r.p.m. in a normal motor vehicle), at which speed the current generated by the dynamo 19 is no longer strong enough to enable the winding 20 to overcome the action of the spring 22. Thenceforth, the latter causes closure of the contacts 24 and 25, the electromagnet 26 is excited and the slide 30 is returned to the position shown in Fig. 1, in which the left part of the cylinder 13 is once more put into communication with the vacuum chamber 41. The course of operations described hereinbefore occurs in a succession of reverse stages, the stage II—III being effected slowly or rapidly according as the accelerator pedal 36 is depressed beyond the point B or not.

Figure 7:
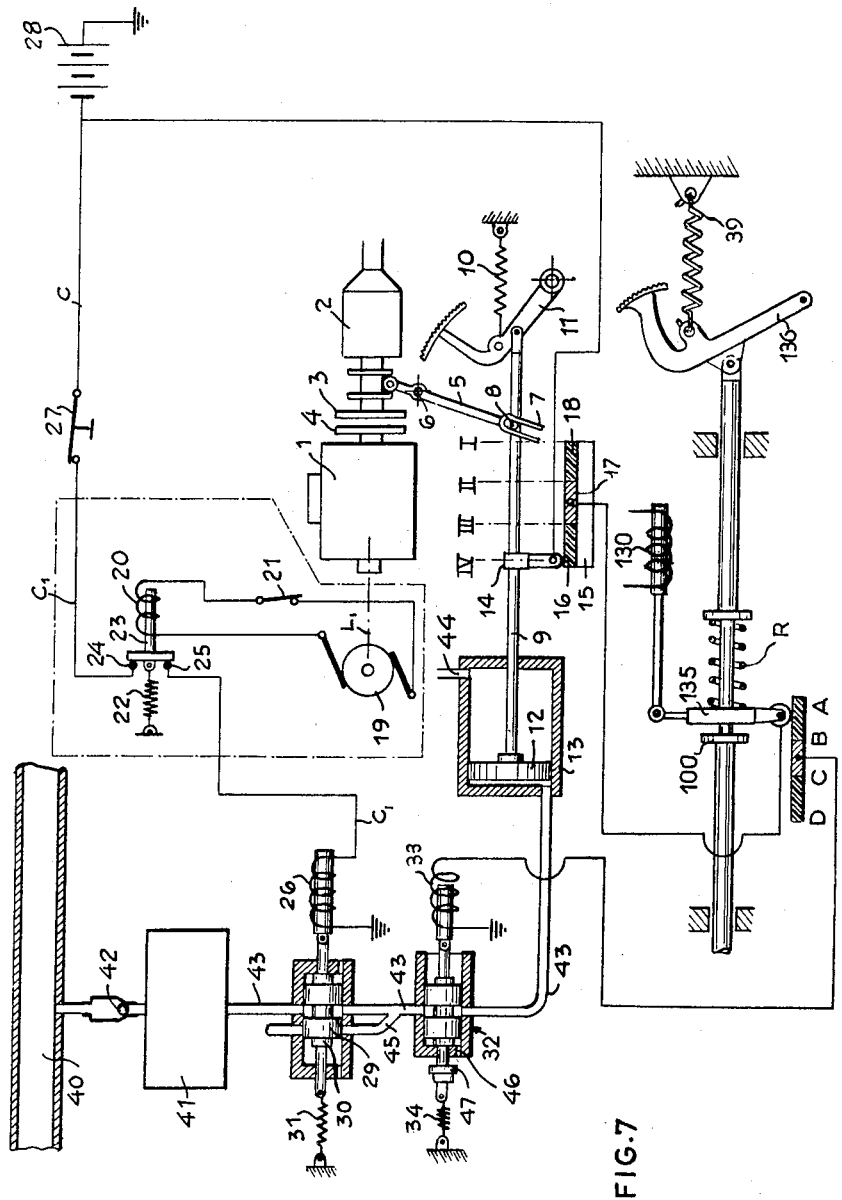
Fig. 7 shows a modification of the control means of the device shown in Fig. 1.

In the modification shown in Fig. 7, the stroke ABCD of the slider 135 (corresponding to the slider 35 of the Fig. 1) is divided into three successive portions AB, BC and CD, portion AB being non-conductive, portion BC conductive and portion CD non-conductive.

As shown in Fig. 7, the slider 135 is normally movable with the accelerator pedal 136 through a spring R continuously urging the said slider towards an abutment 100. The slider 135 however can be brought on the non-conductive portion AB from any position between A and D under compression of said spring R by control means such as an electro-magnet 130, either actuated by the driver or operated from any suitable existing mechanism of the vehicle, for example the change-speed mechanism.

With this arrangement, as the accelerator pedal 136 is depressed, if the aforementioned control means are not actuated, the slider 135 first travels along the non-conductive portion AB, and the clutching-declutching mechanism is not subjected to the control of the distributor 32. The slider 135 then reaches the conductive portion BC and the distributor 32 is actuated so that any clutch engagement or disengagement operation taking place under these conditions is effected according to the above-described three-stage sequence. Finally, if the pedal 136 is further depressed, the slider 135 reaches the non-conductive portion CD, the distributor 32 is put out of action and any clutching or declutching process happening in these circumstances takes place at constant speed.

On the other hand, whatever may be the position of the accelerator pedal 136, when the electro-magnet 130 is excited, the slider 135 is held on or brought back to the non-conductive portion AB. This last arrangement permits inhibiting at will the action of the distributor 32 to establish, whenever desired, normal rapid rate clutching or declutching along the whole stroke of the clutch controlled element.

Fig. 4 shows a modification in the construction of the distributor 32. In this modification, the core plunger of the electromagnet 33 is pivoted to one end of a lever 84 whose other end is connected to a register or valve 85 located in the pipe 43. The register 85 is provided with two small apertures 86 and 87, the aperture 87 being ordinarily closed by a valve 88. In this arrangement, when the register 85 is closed (position shown in dot-dash lines in Fig. 4), the cross-section of the passage for the air drawn in the direction of arrow F is equal to the cross-section of only the aperture 86 as the valve 88 is in this position held against the other aperture 87. On the othere hand, when the air flows through the pipe 43 in the direction opposite to that of arrow F, the cross-section of the passage is equal to the sum of the cross-sections of the apertures 86 and 87, since in this direction of flow the air raises the valve 88. In these conditions, two degrees of effectiveness of the dash-pot effect of the apertured register 85 are afforded, one of which can be utilized for clutch engagement and the other for clutch disengagement so as to create different operating conditions for the middle stage III—II and II—III respectively of these clutch operations.

In the modification shown in Fig. 5, the core plunger of the electromagnet 33 is rigid with the stem 105 of a valve 106 which controls an aperture 107 formed in a wall 108 dividing a chamber 109 into two compartments 110 and 111. The chamber 109 is inserted in the pipe 43 (see Fig. 1) and replaces the distributor 32. The wall 108 is provided with two other apertures 112 and 113. The aperture 112 is controlled by an automatic valve 114 which closes when the air attempts to flow from the compartment 111 into the compartment 110 through said aperture and which opens when the air flows through said aperture in the opposite direction. The aperture 113 is controlled by a needle valve 115 whose stem 116 is provided with an adjusting screw 117. The diameters of the apertures 107 and 112 are equal to at least that of the bore of the pipe 43.

The device just described operates in the following manner:

When the electromagnet 33 is not excited, the valve 106 is open and the air is free to flow in both directions through the aperture 107. These conditions correspond to the rapid operating conditions for clutch engagement and clutch disengagement.

If the electromagnet 33 is excited, it closes the valve 106. Thenceforth, the air, while still being free to pass freely from the compartment 110 into the compartment 111, can only flow in the opposite direction through the throttled passage between the aperture 113 and the needle valve 115. This device provides the same results as that shown in Fig. 4 with the added advantage that the slow operating conditions can be regulated by means of the screw 117.

In the embodiment shown in Fig. 6 the source of fluid for actuating the piston 12 of the cylinder 13 is formed by an oil and air accumulator 48 which is maintained filled by a pump 49 fed by a tank 50 with which the branch pipe 45 of the pipe 43 communicates. Simple constructions have also been shown in Fig. 6 of the distributors 29 and 32 and of the switches, of which latter one is connected to the piston 12 and the other to the accelerator pedal 36.

Each of the distributors 29 and 32 is very simply constructed of a body 51 and 52 respectively, in which is slidable a slide 30 and 46 respectively, a seal between the slide and body being afforded by bellows 53 and 54 respectively. In this arrangement, any escape of oil from the distributors is received by these bellows, whence pipes, such as pipe 55, return this oil to the tank 50. The automatic switch actuated by the piston 12 comprises two pivotable levers 56 and 57 biased by springs 58 and 59 in a counterclockwise direction (as viewed in Fig. 6). Each of the levers 56 and 57 comprises an opening 60 and 61 respectively through which the rod 9 freely extends, this rod connecting the piston 12 to the controlled element 3 of the clutch. Adjustable abutments 62 and 63 against which the levers 56 and 57 bear under the effect of their respective springs determine the relative positions of said levers for each position of the rod 9. This assembly is completed by two switches whose moving contacts 64 and 65 are biased in such manner that, in the absence of any outside action, they rest under the effect of their own resilience respectively against the fixed contact 66 and a neutral contact 67, whereas under the respective actions of the levers 56 and 57 they can be separated from said contacts and brought respectively against a neutral contact 68 and a fixed contact 69 which is electrically connected to the fixed contact 66.

The switch actuated by the pedal 36 likewise comprises an adjustable abutment 70 which co-operates with a pivotable lever 71 having an opening 72 through which freely extends the rod 73 actuated by the pedal 36 and carrying the abutment 70. The lever 71 is constantly biased in a clockwise direction (as viewed in Fig. 6) by a spring 74. This assembly is completed by a switch whose moving contact 75 is biased in such manner that, in the absence of any action of the lever 71, it rests against a neutral contact 76, whereas if the lever 71 acts thereupon (as shown in Fig. 6) it is held against a fixed contact 77 in opposition to the action of its own resilience. The moving contact 75 of the switch is connected to the moving contact 64 of the switch controlled by the lever 56. The fixed contact 77 is connected to the battery and the moving contact 65 of the switch controlled by the lever 57 is connected to the excitation winding 33 of the electromagnet controlling the distributor 32. The operation of this device is identical to that described hereinbefore with reference to Fig. 1. In the position shown in Fig. 6, the pedal 36 is in its fully raised position or is but slightly depressed, the contacts 75 and 77 are closed, which corresponds to the closure of the contacts 35 and 37 shown in Fig. 1. When the pedal 36 is depressed, the abutment 70 comes into contact with the lever 71 and pivots the latter in the counterclockwise direction in opposition to the action of its spring 74 which releases the moving contact 75 of the switch, which, under the effect of its own resilience, opens the contacts 75 and 77 and bears against the neutral contact 76. This corresponds in the embodiment shown in Fig. 1 to the passage of the slider 35 from the conductive portion 37 to the insulated portion 38.

In the position shown in Fig. 6, the device corresponds to full clutch disengagement and the circuit of the electromagnet 33 is open since contact 65 is biased away from fixed contact 69. This relationship is comparable to the position IV of the slider 14 in Fig. 1. When the engine reaches a predetermined speed the current generated by the dynamo 19 becomes sufficiently intense for actuating the contactor 23. At this moment the circuit of the electromagnet 26 is opened in the manner described with reference to Fig. 1 and the spring 31 urges the piston 30 toward its left position (as viewed in Fig. 6) where the supply to the pipe 43 from the accumulator 48 is cut off and the cylinder 13 is connected to exhaust by the branch pipe 45. Thenceforth, the spring 10, which in the presently-described embodiment is shown to be directly associated with the controlled element 3 of the clutch, urges the piston 12 and the rod 9 toward the left (as viewed in Fig. 6) with the dash-pot effect of the pipes 43 and 45 functioning as a limitation of the operating conditions. It can be seen that, owing to the adjustment of the levers 56 and 57, it is the latter which is the first to operate for closing the contacts 65 and 69, thus completing the circuit of the electromagnet 33. This corresponds to the position III of the slider 14 determining the partial throttling of the pipe 43 by the slide 46, which changes the previous rapid operating conditions of the movement of the piston 12 and consequently of the controlled element 3 of the clutch, to the slow operating conditions corresponding to the progressive coupling of the engine. After a certain travel, corresponding to a travel from III to II in Fig. 1, the lever 56 in turn becomes operative and opens the contacts 64 and 66 thus interrupting the circuit of the electromagnet 33. It will be observed that this embodiment has the advantage of rendering the system extremely sensitive, since the contacts, instead of being positively established, are obtained by successive release of the levers 56 and 57 which act on the switches by the elasticity of their springs 59 and 58. The same characteristics obviously apply to the switch controlled by the pedal 36.

It must be understood that the invention is in no way limited to the embodiments described and shown in the drawings, and many modifications and changes may be made therein by those skilled in the art according to the desired applications without departing from the scope of the invention as defined in the appended claims.

What is claimed is:

1. In a system for controlling the operation of a clutch disposed between the driving engine and transmission of an automotive vehicle including an accelerator member movable between an idle position and a fully opened throttle position for controlling the speed of said engine, said clutch including a movable member to be controlled as regards the clutch engagement and disengagement, resilient means operably interrelated with the movable member of the clutch for effecting clutch engagement, a source of fluid under a pressure different than atmospheric pressure, a fluid motor including a pressure responsive member operably connected with said movable member of the clutch and movable between a position determining clutch engagement and a position determining clutch disengagement, and conduit means interconnecting said motor with said source or with an exhaust, the combination with a first valve disposed in said conduit means and positionable to connect said motor with said source and with exhaust, of valve actuating means operably connected with said first valve and operable in response to the speed of said engine for actuating said first valve to a position establishing communication between said motor and said source when the engine speed is below a predetermined value to cause said pressure responsive movable member to move toward the position determining clutch disengagement, said valve actuating means being operable to connect said motor with exhaust when the engine speed is above said predetermined value to cause said pressure responsive movable member to move toward the position determining clutch engagement, and a second valve disposed in said conduit means between said motor and said first valve, said second valve being operable in response to the position of said accelerator member and in response to the position of said pressure responsive movable member of the fluid motor to vary the rate of flow through said second valve in accordance with the displacements of said movable member of the fluid motor only when said accelerator member is positioned between said idle position and a position intermediate said idle position and said fully open throttle position.

2. In a system for controlling the operation of a clutch disposed between the driving engine and transmission of an automotive vehicle including an accelerator pedal movable between an idle position and a fully open throttle position for controlling the speed of the engine, said clutch including a movable member to be controlled as regards clutch engagement and disengagement, resilient means operatively related with the movable member of the clutch for effecting clutch engagement, a source of fluid under a pressure different than atmospheric pressure, a cylinder, and a piston in said cylinder and movable between a position determining clutch engagement and a position determining clutch disengagement, said piston being operatively connected with the movable member of said clutch so as to effect disengagement of the clutch against the action of said resilient means, conduit means connecting said cylinder with said source or with an exhaust, the combination with a first valve operatively associated with said conduit means and biased to a position which connects said cylinder with exhaust, of a first electro-magnet operatively associated with said first valve and adapted when energized to move said first valve to a position in which said cylinder is connected with said source so as to cause said piston to move toward the position of clutch disengagement, a second valve for controlling the rate of flow between said first valve and said cylinder, said second valve being biased to a position permitting substantially unrestricted flow between said first valve and said cylinder, a second electro-magnet operatively associated with said second valve, and adapted, when energized to move said second valve to a position that restricts flow between said first valve and said cylinder, a first electrical circuit for said first electro-magnet for controlling energization and deenergization thereof and including a switch operable in response to the speed of said engine to open said circuit and thereby allow said first valve to connect said cylinder with exhaust when the engine speed is above a predetermined value to cause said piston and said movable member of the clutch to move toward the position of clutch engagement, and a second electrical circuit for controlling energization and deenergization of said second electro-magnet and including a first switch means operatively related with said piston and adapted to maintain said second circuit closed when said piston moves along a predetermined position of its length of stroke that is intermediate the positions determining clutch engagement and clutch disengagement respectively, and a second switch means operatively related with said accelerator pedal and adapted to open said second electrical circuit when said pedal is depressed beyond a predetermined position intermediate said idle position and said fully open throttle position, whereby said second electro-magnet will be energized to provide a restricted flow communication between said cylinder and said first valve only when said second electrical circuit is closed by both said first and second switch means.

3. The combination as claimed in claim 2 and spring means interposed between said second switch means and said accelerator pedal and means for releasably holding said second switch means in circuit interrupting position against the action of said spring means.

4. The combination as claimed in claim 2 and said second valve comprising a movable valve member having two fluid passages therethrough, one of said passages constituting a valve seat, and a check valve operably associated with said seat for permitting fluid flow through said one passage of said movable valve member in one direction only.

5. The combination as claimed in claim 2 and said second valve comprising a chamber having a wall therein dividing the chamber into two compartments, said first valve communicating with one compartment and said cylinder communicating with the other, said wall having first, second and third apertures therein for placing said two compartments into communication with one another, a movable valve member operably associated with the first aperture and normally biased to a position to open said first aperture, said second electro-magnet being connected to said movable valve member so that said movable valve member is caused to close said first aperture electromagnetically in response to actuation of said first and second switch means, a check valve operably associated with said second aperture for allowing passage of fluid through said second aperture in one direction only, and an adjustable needle valve operably associated with said third aperture and adapted to regulate the rate of flow through said third aperture, whereby when the first aperture is closed by said movable valve member, said needle valve throttles communication between said cylinder and said first valve to an extent depending on the adjusted position of said needle valve.

6. The combination as claimed in claim 2 in which said second electrical circuit includes two leads, said first switch means comprising a first fixed contact, a first movable contact biased against said first fixed contact, a second fixed contact, a second movable contact biased away from said second fixed contact, means electrically connecting said first and second fixed contacts, and said second switch means comprising another fixed contact and another movable contact, said another movable contact being biased against said another fixed contact, said another fixed contact being connected to one lead of said second electrical circuit, the other lead of said second electrical circuit being connected to said second movable contact through the coil of said second electro-magnet, said first movable contact being electrically connected to said another movable contact, means actuated in response to movement of the piston and operable in the course of piston movement to clutch engagement to first move the second movable contact against the second fixed contact, thereby closing said second electrical circuit and to thereafter move said first movable contact away from said first fixed contact to open said second electrical circuit, and means operable in response to depression of the accelerator pedal and adapted to cause said another movable contact to move away from said another fixed contact when the accelerator pedal is depressed beyond a given extent.

7. The combination as claimed in claim 2 and said first switch means comprising a first strip including an electrically conductive portion and a non-conductive portion on each side of said electrically conductive portion, and a first sliding contact adapted to slide along said portions and operably connected to said piston, said second switch means comprising a second strip including an electrically conductive portion and a non-conductive portion, a second sliding contact adapted to slide along said second strip, means operatively connecting said second sliding contact to said accelerator pedal so that said second sliding contact engages the non-conductive portion only when the accelerator pedal is depressed beyond a predetermined limit, and the conductive portions of the first and second strips and the first and second sliding contacts being in series connection in said second electrical circuit controlling energization of said second electro-magnet when said first and second sliding contact simultaneously rest on the associated electrically conductive portions of said first and second strips.

8. The combination as claimed in claim 7, and said second strip also including another non-conductive portion, said second sliding contact normally resting on one of said non-conductive portions and being so connected to the accelerator pedal as to come in contact with the conductive portion of the second strip when the accelerator pedal is partly depressed within a predetermined range and to pass to the other non-conductive portion of the second strip when the accelerator pedal is depressed beyond said range.

9. The combination as claimed in claim 8 and means operatively connecting said second sliding contact to said accelerator pedal including a resiliently yieldable connection and control means connected to said second sliding contact and adapted to hold said second sliding contact on said one non-conductive portion of the second strip in opposition to the action of said resiliently yieldable connection when said accelerator pedal is at least partially depressed.

10. In a clutch controlling system for controlling the movable member of a clutch operable to effect engagement and disengagement between a prime mover and a component to be driven, the combination including resilient means operably connected with the movable member of the clutch to bias the same to clutch engaged position, a cylinder, a piston movable in the cylinder and operably connected to the movable member of the clutch so as to move the same to clutch disengaged position against the action of said resilient means, a source of fluid under a pressure different than atmospheric pressure, conduit means providing communication between said source and said cylinder or between said cylinder, and exhaust whereby communication with said source establishes a differential pressure effect in said cylinder on opposite sides of said piston to effect such movement of the piston as to move the movable member of the clutch to clutch disengaging position, first and second valve means operatively associated between said source and said cylinder, said second valve means being between said cylinder and said first valve means, each of said valve means including a movable valve member, the movable member of the first valve means being movable between positions respectively connecting said cylinder with source and said cylinder with exhaust, first valve actuating means operatively associated with the movable member of the first valve means and operable in response to the speed of the prime mover to move said first valve member to a position to connect said cylinder with source when said speed is below a predetermined value to cause said piston to move the movable member of the clutch toward clutch disengaging position and to allow said first valve member to move to a position to connect said cylinder with exhaust when the speed of the prime mover is above said predetermined value to cause said piston and the movable member of the clutch to move toward clutch engaging position, and second valve actuating means operatively connected with the movable valve member of the second valve means to move the same to a position varying the rate of fluid flow between the first valve means and the cylinder, a movable member controlling the speed of the prime mover, and said second valve actuating means being operatively related with both said piston and said movable member so that the variation of the rate of fluid flow between said first valve means and said cylinder is in accordance with the position of the piston in the cylinder and in accordance with the position of said last-mentioned movable member.

References Cited in the file of this patent

UNITED STATES PATENTS

| | | |
|---|---|---|
| 2,739,679 | Randol | Mar. 27, 1956 |
| 2,756,851 | Collins | July 31, 1956 |
| 2,763,347 | Hanbourdin et al. | Sept. 18, 1956 |